(12) United States Patent
Kalhan et al.

(10) Patent No.: US 11,991,561 B2
(45) Date of Patent: May 21, 2024

(54) RESERVATION CHANNEL TRANSMISSION FORWARDING IN VEHICLE-TO-VEHICLE COMMUNICATIONS

(71) Applicants: Kyocera Corporation, Kyoto (JP); Amit Kalhan, San Diego, CA (US); Henry Chang, San Diego, CA (US)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 479 days.

(21) Appl. No.: 17/289,674

(22) PCT Filed: Nov. 1, 2019

(86) PCT No.: PCT/US2019/059530
§ 371 (c)(1),
(2) Date: Apr. 28, 2021

(87) PCT Pub. No.: WO2020/093002
PCT Pub. Date: May 7, 2020

(65) Prior Publication Data
US 2021/0410018 A1 Dec. 30, 2021

Related U.S. Application Data

(60) Provisional application No. 62/772,353, filed on Nov. 28, 2018, provisional application No. 62/758,770, (Continued)

(51) Int. Cl.
*H04W 4/46* (2018.01)
*H04W 28/26* (2009.01)
(Continued)

(52) U.S. Cl.
CPC ............. *H04W 28/26* (2013.01); *H04W 4/46* (2018.02); *H04W 72/20* (2023.01);
(Continued)

(58) Field of Classification Search
CPC ....... H04W 28/26; H04W 4/46; H04W 72/20; H04W 72/0446; H04W 84/042;
(Continued)

(56) References Cited

U.S. PATENT DOCUMENTS

| 2010/0182982 A1* | 7/2010 | Yim ..................... H04W 72/569 370/338 |
| 2015/0078291 A1* | 3/2015 | Guner ............... H04W 74/0891 370/329 |

(Continued)

OTHER PUBLICATIONS

CAICT; "Discussions on Transmission Collisions in the Sidelink Resource Allocation," R1-1811521; 3GPP TSG RAN WG1 Meeting #94bis; Chengdu, CN; Sep. 28, 2018.

(Continued)

*Primary Examiner* — Kenneth T Lam

(57) ABSTRACT

The methods and systems discussed herein describe a first wireless communication device forwarding a first reservation signal, which identifies one or more time-slots that have been reserved by a second wireless communication device, to avoid "merging collisions." In some examples, the first wireless communication device also receives a second reservation signal from a third wireless communication device, which identifies at least one time-slot that is the same as a time-slot that was identified in the first reservation signal. The first wireless communication device transmits a forwarded reservation signal that identifies the time-slots reserved by whichever of the second wireless communication device and the third wireless communication device has higher priority data to transmit. In other examples, the first wireless communication device transmits the forwarded reservation signal if a received power value of the first reservation signal is within a pre-defined received power range.

18 Claims, 5 Drawing Sheets

Related U.S. Application Data filed on Nov. 12, 2018, provisional application No. 62/754,408, filed on Nov. 1, 2018.

(51) Int. Cl.
*H04W 72/20* (2023.01)
*H04W 72/0446* (2023.01)
*H04W 84/04* (2009.01)
*H04W 84/18* (2009.01)

(52) U.S. Cl.
CPC ...... *H04W 72/0446* (2013.01); *H04W 84/042* (2013.01); *H04W 84/18* (2013.01)

(58) Field of Classification Search
CPC ..... H04W 84/18; H04W 4/023; H04W 72/56; H04W 74/002
See application file for complete search history.

(56) References Cited

U.S. PATENT DOCUMENTS

| | | | |
|---|---|---|---|
| 2015/0131637 A1* | 5/2015 | Rubin | G01C 21/26 370/337 |
| 2017/0188391 A1* | 6/2017 | Rajagopal | H04W 74/0816 |
| 2018/0098322 A1* | 4/2018 | Yoon | H04W 56/0005 |
| 2018/0227882 A1* | 8/2018 | Freda | H04W 8/005 |
| 2019/0380146 A1* | 12/2019 | Smely | H04W 74/0808 |
| 2020/0120685 A1* | 4/2020 | Lee | H04W 72/542 |
| 2020/0162878 A1* | 5/2020 | Zhuang | H04W 4/40 |
| 2021/0219320 A1* | 7/2021 | Belleschi | H04W 72/20 |
| 2021/0385694 A1* | 12/2021 | Freda | H04W 28/0289 |
| 2021/0400451 A1* | 12/2021 | Kalhan | H04W 4/021 |
| 2021/0400723 A1* | 12/2021 | Kalhan | H04W 72/1263 |

\* cited by examiner

RESERVATION CHANNEL TRANSMISSION FORWARDING IN VEHICLE-TO-VEHICLE COMMUNICATIONS

CLAIM OF PRIORITY

The present application claims priority to Provisional Application No. 62/754,408, entitled "RESERVED TIME-SLOTS LIST TO AVOID TRANSMISSION COLLISIONS IN VEHICLE-TO-VEHICLE COMMUNICATIONS", filed Nov. 1, 2018; Provisional Application No. 62/758,770, entitled "RESERVATION CHANNEL TRANSMISSION FORWARDING IN V2V COMMUNICATIONS", filed Nov. 12, 2018; and Provisional Application No. 62/772,353, entitled "RESERVATION CHANNEL TRANSMISSION FORWARDING IN V2V COMMUNICATIONS", filed Nov. 28, 2018, all of which are assigned to the assignee hereof and hereby expressly incorporated by reference in their entirety.

FIELD

This invention generally relates to wireless communications and more particularly to vehicle-to-everything (V2X) communications between wireless communication devices.

BACKGROUND

A vehicle ad-hoc network (VANET) is an autonomously created wireless network of vehicles. In some VANETs, the wireless communication devices, which are located within the vehicles of the VANET, autonomously select the time-frequency resources for data transmissions to other vehicles within the VANET. However, if the number of transmitting vehicle-to-vehicle (V2V) devices is large with respect to the resources available for data transmissions, the probability of data transmission collisions is high.

SUMMARY

The methods and systems discussed herein describe a first wireless communication device forwarding a first reservation signal, which identifies one or more time-slots that have been reserved by a second wireless communication device, to avoid "merging collisions." In some examples, the first wireless communication device also receives a second reservation signal from a third wireless communication device, which identifies at least one time-slot that is the same as a time-slot that was identified in the first reservation signal. If the data to be transmitted by the second wireless communication device has a higher priority than the data to be transmitted by the third wireless communication device, the first wireless communication device transmits a forwarded reservation signal that identifies the time-slots reserved by the second wireless communication device. In other examples, the first wireless communication device transmits the forwarded reservation signal if a received power value of the first reservation signal is within a pre-defined received power range and/or the wireless communication device is within a geographical distance from the second device.

DETAILED DESCRIPTION

Figure 1A:
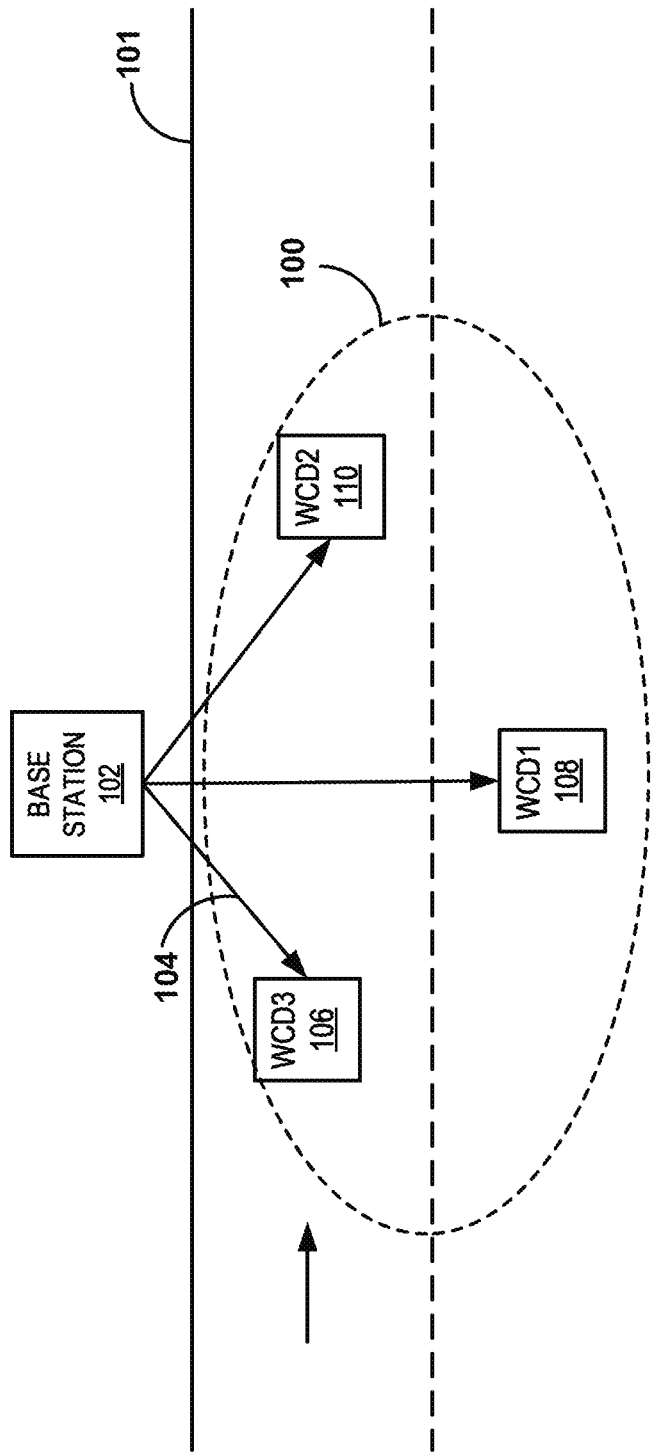
FIG. 1A is a block diagram of an example of a system in which a plurality of wireless communication devices are nodes of a vehicle ad-hoc network (VANET).

The examples discussed below are generally directed to vehicle-to-vehicle (V2V) communication between two or more vehicles that are part of a vehicle ad-hoc network (VANET). However, any of the following examples may be applied to vehicle-to-everything (V2X) communication, which is the passing of information from a vehicle to any entity that may affect the vehicle or that the vehicle may affect. For example, V2X is a vehicular communication system that incorporates other, more specific types of communication, including V2V, V2I (vehicle-to-infrastructure), V2N (vehicle-to-network), V2P (vehicle-to-pedestrian), V2D (vehicle-to-device), and V2G (vehicle-to-grid). There are two types of V2X communication technology depending on the underlying technology being used: wireless local area network (WLAN)-based V2X, and cellular-based V2X (C-V2X). Some examples of V2X protocols include Long-Term Evolution (LTE) (Rel-14) V2X Mode 4 and 5G New Radio (NR) V2X Mode 2.

In order to minimize the number of data transmission collisions in a VANET, a wireless communication device interested in transmitting data transmits a reservation signal, which is also referred to herein as a reservation channel transmission, which indicates resources to be used for the data transmission at a future time. The other wireless communication devices in the VANET receive and decode this reservation signal in order to identify the resources that will be used by the transmitting wireless communication device for future data transmissions. In order to avoid collisions, the other wireless communication devices take the resources identified in the reservation signal into account when selecting transmission resources that will be used for their respective future data transmissions.

In accordance with one example of a resource selection method, a wireless communication device that is interested in transmitting data uses long-term sensing to discover which resources are already periodically being used by one or more other wireless communication devices. When an actual data packet arrives at the wireless communication device, the wireless communication device uses short-term sensing to detect, among the remaining idle resources, an idle set of resources. In general, the sensing may be based on the successful decoding of the control channel and/or the signal-to-noise measurement of the reference signals embedded within the control/data channels above a given threshold value. The wireless communication device then transmits a reservation signal to reserve resources, which were identified as being idle, for a future data transmission.

Although the sensing method allows the wireless communication devices to select the unused time-slots, it is still possible for the data transmissions to collide due to the mobility of the wireless communication devices. For example, a "merging collision" occurs when a first wireless communication device moves into a region where there is already a second wireless communication device using the same time-slot as the first wireless communication device. For example, as shown in FIG. 1B, a "merging collision" would happen when the accelerating wireless communication device 106 is about to enter the coverage area 111 of wireless communication device 110 and both wireless communication devices 106, 110 happen to be using the same time-slot, $t_m$, for their respective data transmissions. The sensing method, described above, does not help avoid the "merging collision" in this scenario because wireless communication device 106 will not detect the out-of-range wireless communication device 110.

The methods and systems discussed herein describe a first wireless communication device forwarding a first reservation signal, which identifies one or more time-slots that have been reserved by a second wireless communication device, to avoid "merging collisions." In some examples, the first wireless communication device also receives a second reservation signal from a third wireless communication device, which identifies at least one time-slot that is the same as a time-slot that was identified in the first reservation signal. If the data to be transmitted by the second wireless communication device has a higher priority than the data to be transmitted by the third wireless communication device, the first wireless communication device transmits a forwarded reservation signal that identifies the time-slots reserved by the second wireless communication device. If the data to be transmitted by the third wireless communication device has a higher priority than the data to be transmitted by the second wireless communication device, the first wireless communication device transmits a forwarded reservation signal that identifies the time-slots reserved by the third wireless communication device. In some examples, the forward reservation signal also comprises one or more of the following: reservations for multiple time-slots, Global Positioning System (GPS) information, a zone identifier (zone ID), a number of time-slots reserved information, a cell identifier (cell ID), a group identifier (group ID), a frame-offset, and a subframe-offset. In other examples, the first wireless communication device transmits the forwarded reservation signal if only the received power value of the first reservation signal is within a pre-defined received power range and/or the wireless communication device is within a geographical distance from the second device For the examples described herein, it is assumed that the wireless communication devices are equipped with a Global Positioning System (GPS) receiver and that synchronization among the wireless communication devices is performed using the one pulse-per-second (1 PPS) signal provided by the GPS receiver. Using the 1 PPS signal, the wireless communication devices obtain common reference timing, synchronized with each other and become aware of the frame-boundaries. Each frame consists of a constant number of fixed duration time-slots (e.g., the duration of each frame is 100 milliseconds long where each time-slot within the frame is 0.5 ms, resulting in 200 time-slots per frame). As a result, every wireless communication device has the knowledge of the frame-number and time-slot-number.

Figure 1B:
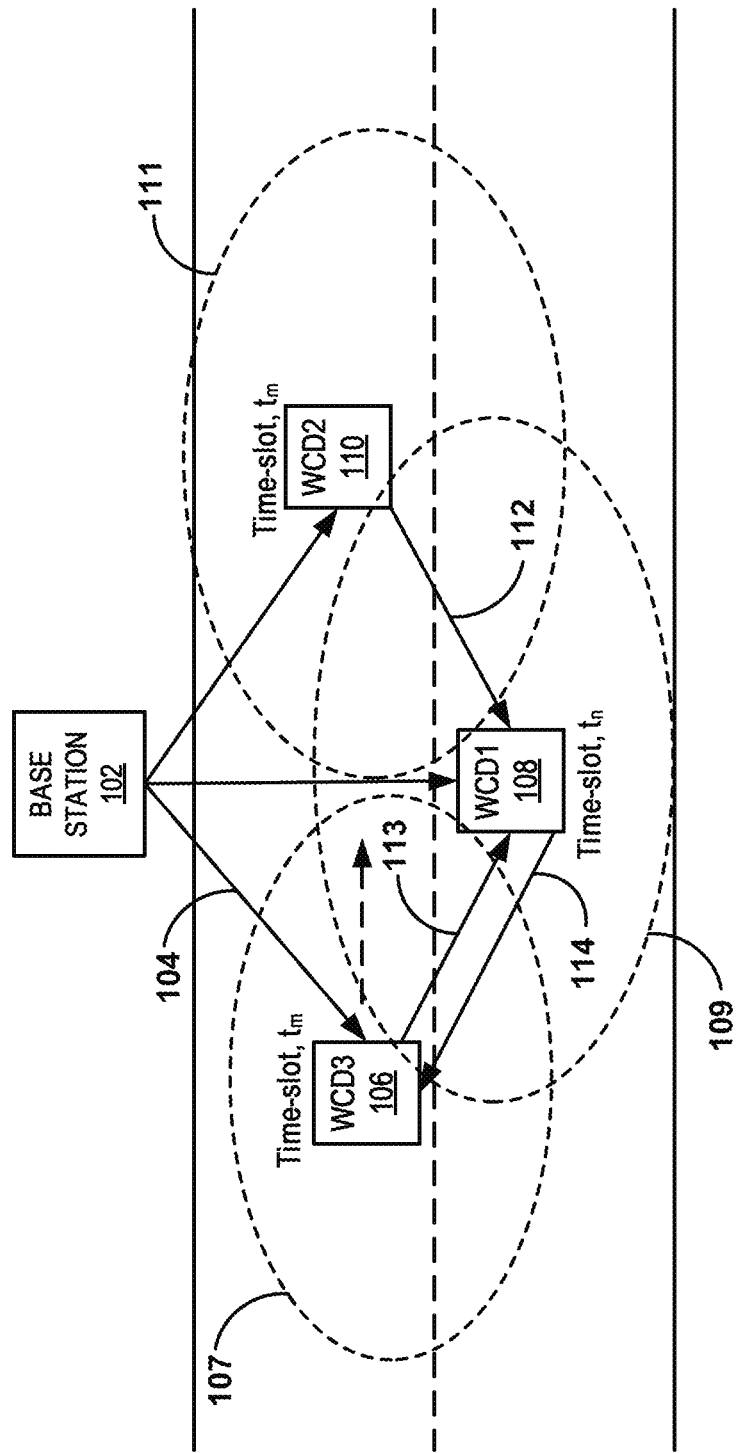
FIG. 1B is a block diagram of an example of a system in which the wireless communication devices of FIG. 1A are using reservation signal forwarding to avoid data transmission collisions in the VANET.

FIG. 1A is a block diagram of an example of a system in which a plurality of wireless communication devices are nodes of a vehicle ad-hoc network (VANET). For the example of FIG. 1A, VANET 100 is located on roadway 101 and includes first wireless communication device, WCD1, 108, second wireless communication device, WCD2, 110, and third wireless communication device, WCD3, 106. In other examples, VANET 100 may have a different number of wireless communication devices than that shown in FIG. 1A.

VANET 100 is wirelessly connected to a radio access network (not shown) via an infrastructure communication node (e.g., base station 102 or a road side unit (RSU)), which provides various wireless services to one or more of the wireless communication devices that are part of VANET 100. For the example shown in FIG. 1A, VANET 100 operates in accordance with at least one revision of the 3rd Generation Partnership Project Long Term Evolution (3GPP LTE) communication specification. In other examples, VANET 100 may operate in accordance with other communication specifications.

In the interest of clarity and brevity, only one infrastructure communication node (e.g., base station 102) is shown in FIG. 1A. However, in other examples, any suitable number of infrastructure communication nodes may be utilized by VANET 100 in order to obtain/maintain communication with the network. For the example shown in FIG. 1A, base station 102, sometimes referred to as eNodeB or eNB, communicates with wireless communication devices 106, 108, 110 via wireless communication link 104. As referenced earlier, the infrastructure communication node is a road side unit (RSU), in other examples.

For the example shown in FIG. 1A, wireless communication link 104 is shown as a broadcast downlink signal from base station 102 to wireless communication devices 106, 108, 110. Wireless communication devices 106, 108, 110 are also capable of transmitting uplink signals (not shown) to base station 102. In the example of FIG. 1A, wireless communication devices 106, 108, 110 are each integrated into a vehicle as an onboard unit (OBU). In other examples, wireless communication devices 106, 108, 110 may simply be user equipment (UE) devices that are located within a vehicle. Some examples of user equipment devices include: a mobile phone, a transceiver modem, a personal digital assistant (PDA), or a tablet, for example. Each wireless communication device 106, 108, 110 that is connected to VANET 100 is considered to be a node of VANET 100. As indicated by the arrow in FIG. 1A, the vehicles in which wireless communication devices 106, 108, 110 are located are traveling from left to right on roadway 101.

Figure 2A:
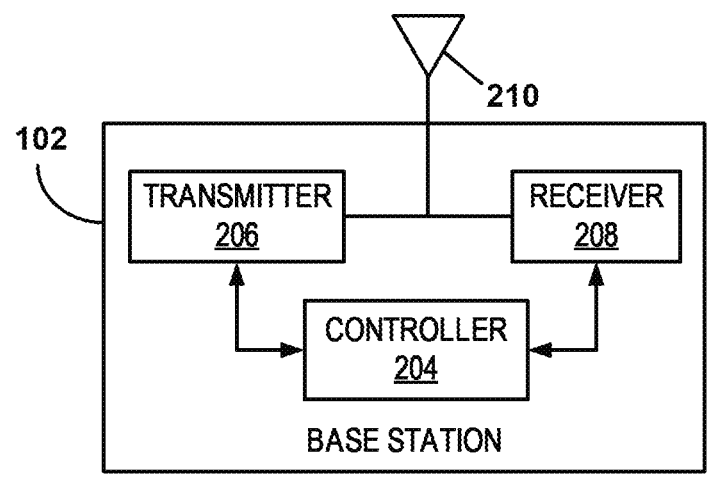
FIG. 2A is a block diagram of an example of the base station shown in FIG. 1A.

Base station 102 is connected to the network through a backhaul (not shown) in accordance with known techniques. As shown in FIG. 2A, base station 102 comprises controller 204, transmitter 206, and receiver 208, as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of the downlink signal 104 and can apply any one of a plurality of modulation orders. The demodulator demodulates any uplink signals received at base station 102 in accordance with one of a plurality of modulation orders.

As mentioned above, base station 102 provides (1) various wireless services to one or more wireless communication devices 106, 108, 110, and (2) network connectivity to VANET 100. Base station 102 provides these services and connectivity by transmitting downlink signal 104, via transmitter 206 and antenna 210, to wireless communication devices 106, 108, 110. In the example of FIG. 1A, the downlink signal 104 is transmitted in a System Information Block (SIB) message that is broadcast to all wireless communication devices 106, 108, 110 that are nodes of VANET 100. Although not explicitly shown in FIG. 1A, base station 102 is capable of receiving uplink signals, via antenna 210 and receiver 208, from wireless communication devices 106, 108, 110.

Figure 2B:
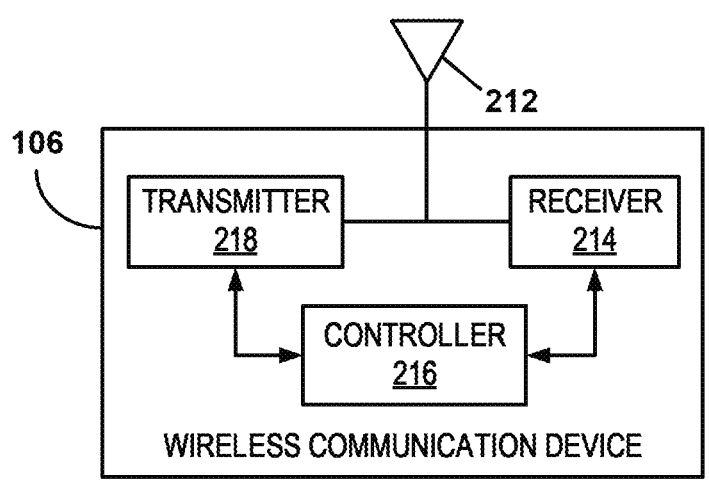
FIG. 2B is a block diagram of an example of a wireless communication device shown in FIG. 1A.

As shown in FIG. 2B, wireless communication device 106 comprises controller 216, transmitter 218, and receiver 214, as well as other electronics, hardware, and code. Although FIG. 2B specifically depicts the circuitry and configuration of wireless communication device 106, the same wireless communication device circuitry and configuration is utilized for wireless communication devices 108, 110 in VANET 100. Wireless communication device 106 is any fixed, mobile, or portable equipment that performs the functions described herein. The various functions and operations of the blocks described with reference to wireless communication device 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a wireless communication device. An example of a suitable controller 216 includes code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the wireless communication device functions. The required components may depend on the particular functionality required by the wireless communication device.

Transmitter 218 includes a modulator (not shown), and receiver 214 includes a demodulator (not shown). The modulator can apply any one of a plurality of modulation orders to modulate the signals to be transmitted as uplink signals (not shown). The demodulator demodulates the downlink signals 104 in accordance with one of a plurality of modulation orders.

In the example shown in FIG. 1B, there is a possibility of a "merging collision" between wireless communication device 106 and wireless communication device 110. Direct communication of a reservation signal (e.g., reservation channel transmission) between wireless communication devices 106 and 110 is not possible since coverage area 107 of wireless communication device 106 cannot reach wireless communication device 110. Similarly, coverage area 111 of wireless communication device 110 cannot reach wireless communication device 106. However, coverage area 109 of wireless communication device 108 can reach both wireless communication device 106 and wireless communication device 110.

As wireless communication device 106 accelerates (e.g., from left to right, as shown by the dashed arrow) and gets closer to wireless communication device 110, there is a possibility of a "merging collision" to occur in time-slot $t_m$, which is being used by both wireless communication devices 106, 110 for data transmissions. Wireless communication device 108 receives reservation signal 112 from wireless communication device 110. Reservation signal 112 identifies one or more time-slots, including time-slot $t_m$, that have been reserved by wireless communication device 110 for data transmissions within VANET 100.

In some examples, wireless communication device 108 also receives reservation signal 113 from wireless communication device 106. Reservation signal 113 identifies one or more time-slots, including time-slot $t_m$, that have been reserved by wireless communication device 106 for data transmissions within VANET 100. In the event that reservation signal 113 identifies at least one time-slot that is the same as a time-slot that was identified in the reservation signal 112 (e.g., $t_m$), wireless communication device 108 determines whether the data to be transmitted by wireless communication device 110 has a higher priority than the data to be transmitted by wireless communication device 106. If the data to be transmitted by the wireless communication device 110 has a higher priority (e.g., for emergency communications or safety alerts) than the data to be transmitted by wireless communication device 106, then wireless communication device 108 will transmit a forwarded reservation signal 114 that identifies the one or more time-slots that have been reserved by wireless communication device 110, as described below.

Wireless communication device 108 transmits (e.g., broadcasts) forwarded reservation signal 114 to other wireless communication devices in VANET 100. In some examples, wireless communication device 108 transmits forwarded reservation signal 114 if a received power value of the reservation signal 112 is within a pre-defined received power range and/or the wireless communication device is within a geographical distance from the second device.

Forwarded reservation signal 114 identifies the one or more time-slots that have been reserved by wireless communication device 110 for data transmissions within VANET 100. Forwarded reservation signal 114 is based, at least partially, on reservation signal 112 and contains information upon which one or more additional wireless communication devices may determine whether to transmit data within the one or more time-slots identified in forwarded reservation signal 114. Wireless communication device 106 receives forwarded reservation signal 114 that was transmitted from wireless communication device 108. Since time-slot $t_m$ is listed as one of the reserved time-slots being used by a neighboring wireless communication device, wireless communication device 106 refrains from transmitting data in time-slot $t_m$ and starts the process of selecting an unused time-slot. As a result, the "merging collision" is avoided.

In some examples, reservation signal 112 and/or forwarded reservation signal 114 comprise one or more of the following: reservations for multiple time-slots, Global Positioning System (GPS) information, a zone identifier (zone ID), a number of time-slots reserved information, a cell identifier (cell ID), a group identifier (group ID), a frame-offset, and a subframe-offset. Reservations for multiple time-slots refers to examples in which a single reservation signal or forwarded reservation signal identifies a plurality of time-slots (e.g., time-slots $T_A$, $T_B$, and $T_C$) that have been reserved for data transmissions. The GPS information includes, for example, information such as a wireless communication device's geo-location, speed, heading, and zone identifier. The zone identifier (zone ID) identifies a zone in which a wireless communication device is located. A number of time-slots reserved information refers to examples in which a single reservation signal or forwarded reservation signal contains a number (e.g., 3 time-slots) that indicates how many time-slots are being reserved by that particular reservation signal or forwarded reservation signal. A cell identifier (cell ID) identifies a cell that is serving a wireless communication device. A group identifier (group ID) identifies a group to which a wireless communication device belongs. The frame-offset indicates the frame-offset being used by a wireless communication device. The subframe-offset indicates the subframe-offset being used by a wireless communication device. Inclusion of one or more of the foregoing items in reservation signal 112 and/or forwarded reservation signal 114 advantageously provides information when the wireless communication devices are served by different operators and/or by different base stations. For example, each base station could have a different frame numbering. Thus, the wireless communication devices can take information such as the cell ID and the offset into account to identify the reserved time-slots from a wireless communication device served by a different base station.

In some examples, the physical format of reservation signal 112 is hard coded. In other examples, the physical format of reservation signal 112 is configured via higher layer (e.g., Radio Resource Control) signaling. In other examples, the reserved time-slots are identified in a control channel of the reservation signal 112. In still further examples, the reserved time-slots are identified in a control channel of the forwarded reservation signal 114.

In some examples, wireless communication device 108 determines that wireless communication device 108 should forward reservation signal 112 from wireless communication device 110 as forwarded reservation signal 114. For example, if wireless communication device 108 is located near an edge of coverage area 111 associated with wireless communication device 110, then wireless communication device 108 determines that wireless communication device 108 should forward reservation signal 112 from wireless communication device 110 as forwarded reservation signal 114. In some examples, wireless communication device 108 determines that it is located near an edge of coverage area 111 associated with wireless communication device 110 by determining whether a received power value of reservation signal 112, as measured at wireless communication device 108, is below a pre-defined threshold value. In other examples, wireless communication device 108 determines that it is located near an edge of coverage area 111 associated with wireless communication device 110 based, at least partially, on location information associated with the wireless communication device 110. In some instances, wireless communication device 108 receives the location information (e.g., GPS information and/or zone ID) associated with the wireless communication device 110 in reservation signal 112. In other instances, wireless communication device 108 could already be in communication with wireless communication device 110 such that wireless communication device 108 is already aware of the location of wireless communication device 110.

In other examples, wireless communication device 108 autonomously re-broadcasts updates to a previously forwarded reservation signal 114. For example, assume that reservation signal 112 and forwarded reservation signal 114 both identify a plurality of time-slots (e.g., $T_A$, $T_B$, and $T_C$) that are reserved by wireless communication device 110. After wireless communication device 110 transmits data utilizing time-slot $T_A$, wireless communication device 108 will transmit an updated forwarded reservation signal that identifies one or more remaining time-slots (e.g., $T_B$ and $T_C$), which were previously reserved by wireless communication device 110 for data transmissions within the VANET. Thus, in this example, the first updated forwarded reservation signal, which identifies $T_B$ and $T_C$, is transmitted after at least one data transmission by wireless communication device 110 that utilizes time-slot $T_A$. The second updated forwarded reservation signal, which identifies $T_C$, is transmitted after at least one data transmission by wireless communication device 110 that utilizes time-slot $T_B$. In some examples, the number of time-slots reserved information (e.g., the number of reserved time-slots) is included in reservation signal 112 transmitted from wireless communication device 110.

Once wireless communication device 108 determines that it should forward reservation signal 112 as forwarded reservation signal 114, it is important that wireless communication device 108 transmits forwarded reservation signal 114 before the usefulness of forwarded reservation signal 114 expires. Optimally, wireless communication device 108 will transmit forwarded reservation signal 114 in the very next time-slot after the time-slot in which reservation signal 112 was transmitted. However, the next time-slot may not be available since it is likely that another wireless communication device will be using the next time-slot. Thus, in some examples, wireless communication device 108 will transmit forwarded reservation signal 114 in a next available time-slot. However, as shown in FIG. 3, there is another option besides waiting for the next available time-slot.

Figure 3:
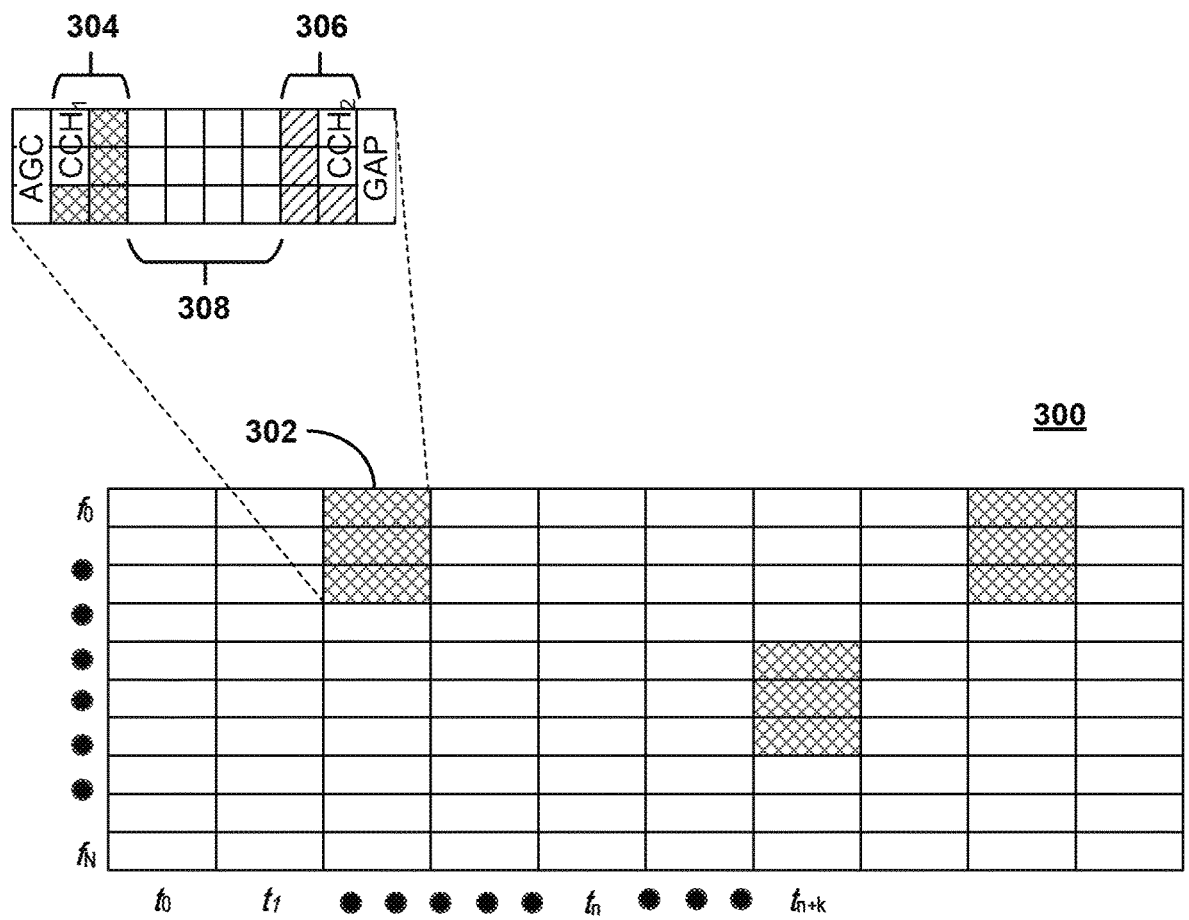
FIG. 3 is a diagram of an example in which a reservation signal is received in a first portion of a 5G New Radio (NR) slot and a forwarded reservation signal is transmitted in a second portion of the 5G NR slot.

FIG. 3 is a diagram of an example in which a reservation signal is received in a first portion of a 5G New Radio (NR) slot and a forwarded reservation signal is transmitted in a second portion of the 5G NR slot. For the example shown in FIG. 3, time-frequency domain 300 is provided where time, t, is represented on the horizontal axis and frequency, f, is represented on the vertical axis. Each box in the 10×10 grid of time-frequency domain 300 represents a time-slot that has both a corresponding time and frequency.

Each of the time-slots of time-frequency domain 300 may be allocated by the network to be utilized as resources for data transmissions, reservation channel transmissions, confirmation channel transmissions, or for reservation/confirmation channel transmissions. The reservation channel resource pool is comprised of the time-slots that are allocated for reservation channel transmissions.

In the example shown in FIG. 3, the network has utilized a pre-determined algorithm or formula to configure (e.g., allocate) 3 groups of time-slots, which are distributed non-periodically in time-frequency domain 300 and are filled in with cross-hatching, to be utilized in VANET 100 for reservation channel transmissions. Although a particular distribution and number of allocated time-slots has been shown in the example of FIG. 3, any other suitable distribution and number of allocated time-slots may be used, in other examples. In still other cases, the allocated time-slots for reservation channel transmissions could be uniformly distributed within time-frequency domain 300. In other implementations, the devices could autonomously select the time-slots for the reservation signal transmissions.

In the example shown in FIG. 3, a group of time-slots 302 allocated for reservation channel transmissions is 3 $F_s$ wide in the frequency domain, where $F_s$ is the width of a single frequency band within time-frequency domain 300, and 1 time-slot long in the time domain. The first group of time-slots 302 shows a simplified version of a bi-directional 5G NR sidelink slot structure that is utilized within the group of time-slots 302. For example, the first symbol of the time-slot 302 is used for Automatic Gain Control (AGC), which receiving devices use to adjust their receiving gain to enable proper data decoding. The last symbol of the same time-slot 302 is used for a guard period (GAP), which is required to allow radio frequency (RF) switching between transmitting and receiving.

Using this 5G NR slot structure, reservation signal 112 is received, at wireless communication device 108, in first portion 304 (e.g., filled in with cross-hatching) of the time-slot 302. Forwarded signal 114 is transmitted, from wireless communication device 108, in second portion 306 (e.g., filled in with hatching) of the same time-slot 302. The symbols in between first portion 304 and second portion 306 are utilized for the Physical Sidelink Shared Channel (PSSCH), in some examples. In the example shown in FIG. 3, first control information ($CCH_1$) associated with reservation signal 112 is received in first portion 304 of the time-slot 302, and second control information ($CCH_2$) associated with forwarded reservation signal 114 is transmitted in second portion 306 of the same time-slot 302. In some examples, the control information is transmitted in a Physical Sidelink Control Channel (PSCCH).

Base station 102 transmits, to one or more wireless communication devices 106, 108, 110, information regarding the non-periodic distribution of time-frequency resources (e.g., reservation channel resource pool) that are available to use for reservation channel transmissions. Upon receipt of the information regarding the reservation channel resource pool, the wireless communication devices select, from the reservation channel resource pool, time-frequency resources to use for reservation channel transmissions. In the example shown in FIG. 3, the time-slot 302 are selected for reservation channel transmissions.

After selecting the time-slot 302, wireless communication device 110 transmits reservation signal 112 over the first portion 304 of the selected time-slot 302. After receiving reservation signal 112 in first portion 304 of time-slot 302, wireless communication device 108 transmits forwarded reservation signal 114 in second portion 306 of time-slot 302.

In some examples, to differentiate between reservation signal 112 and forwarded reservation signal 114, wireless communication device 108 sets a flag in forwarded reservation signal 114 to indicate to wireless communication device 106 that reservation information contained in forwarded reservation signal 114 is being relayed. For example, the originating device of reservation signal 112 (e.g., wireless communication device 110) sets the flag=0. The first wireless communication device to broadcast forwarded reservation signal 114 (e.g., wireless communication device 108) increments the flag by 1. Subsequent re-broadcasts of the forwarded reservation signal 114 (e.g., at each hop) will continue to increment the flag by 1. Thus, the value of the flag included in each reservation signal or forwarded reservation signal will indicate the hop number to any wireless communication device that receives the reservation signal/forwarded reservation signal.

In other examples, the receiving wireless communication device 106 implicitly assumes that the broadcast in second portion 306 of a time-slot is the forwarded reservation signal 114. If multiple neighboring wireless communication devices are broadcasting the exact same forwarded reservation signal 114 in second portion 306 of the same time-slot, then the wireless communication devices that receive those duplicate transmissions of the same forwarded reservation signal 114 simply treat them as duplicate copies of the same forwarded reservation signal 114.

Figure 4:
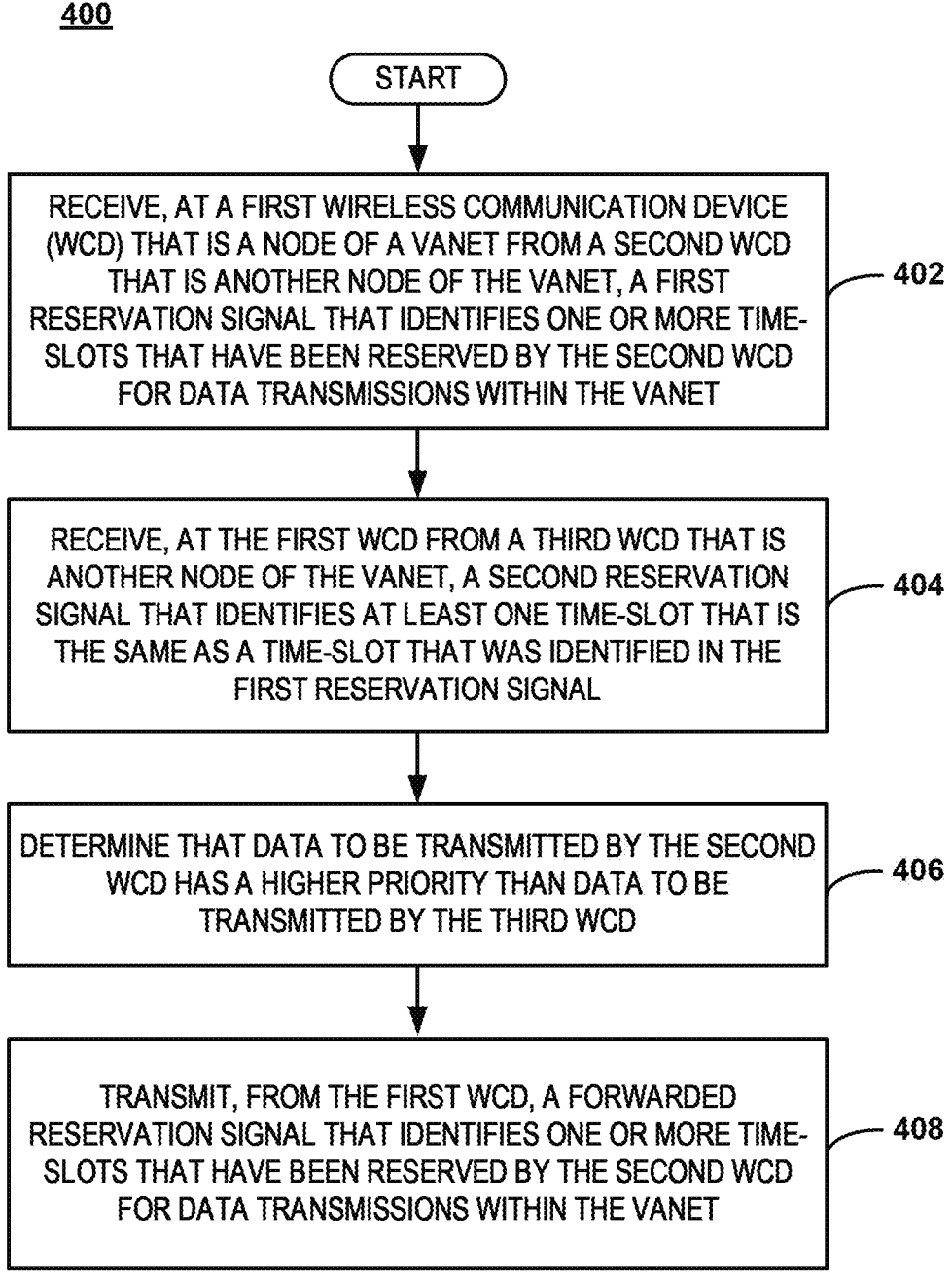
FIG. 4 is a flowchart of an example of a method in which a first wireless communication device receives, from a second wireless communication device, a reservation signal that identifies one or more time-slots that have been reserved by the second wireless communication device for data transmissions. The first wireless communication device transmits a forwarded reservation signal that identifies the one or more time-slots that have been reserved by the second wireless communication device.

FIG. 4 is a flowchart of an example of a method in which a first wireless communication device receives, from a second wireless communication device, a reservation signal that identifies one or more time-slots that have been reserved by the second wireless communication device for data transmissions. The first wireless communication device transmits a forwarded reservation signal that identifies the one or more time-slots that have been reserved by the second wireless communication device. The method 400 begins at step 402 with receiving, at first wireless communication device 108, which is a node of VANET 100, from second wireless communication device 110, which is another node of VANET 100, first reservation signal 112 that identifies one or more time-slots that have been reserved by second wireless communication device 110 for data transmissions within VANET 100. At step 404, first wireless communication device 108 receives, from third wireless communication device 106, which is another node of VANET 100, second reservation signal 113 that identifies at least one time-slot that is the same as a time-slot that was identified in first reservation signal 112. At step 406, first wireless communication device 108 determines that data to be transmitted by second wireless communication device 110 has a higher priority than data to be transmitted by third wireless communication device 106. At step 408, first wireless communication device 108 transmits forwarded reservation signal 114 that identifies one or more time-slots that have been reserved by second wireless communication device 110 for data transmissions within VANET 100. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at a first wireless communication device that is a node of a vehicle ad-hoc network (VANET) from a second wireless communication device that is another node of the VANET, a first reservation signal that identifies one or more time-slots that have been reserved by the second wireless communication device for data transmissions within the VANET;
   receiving, at the first wireless communication device from a third wireless communication device that is another node of the VANET, a second reservation signal that identifies at least one time-slot that is the same as a time-slot that was identified in the first reservation signal;
   determining that data to be transmitted by the second wireless communication device has a higher priority than data to be transmitted by the third wireless communication device; and
   transmitting, from the first wireless communication device, a forwarded reservation signal that identifies the one or more time-slots that have been reserved by the second wireless communication device for data transmissions within the VANET, the forwarded reservation signal based, at least partially, on the first reservation signal and containing information upon which one or more additional wireless communication devices may determine whether to transmit data within the one or more time-slots identified in the forwarded reservation signal.

2. The method of claim 1, wherein transmitting the forwarded reservation signal comprises:
   transmitting the forwarded reservation signal if a received power value of the first reservation signal is within a pre-defined received power range.

3. The method of claim 1, wherein transmitting the forwarded reservation signal comprises:
   transmitting the forwarded reservation signal if the first wireless communication device is within a geographical distance from the second wireless communication device.

4. The method of claim 1, wherein a physical format of the first reservation signal is hard coded.

5. The method of claim 1, wherein a physical format of the first reservation signal is configured via higher layer signaling.

6. The method of claim 1, wherein the one or more time-slots are identified in a control channel of the first reservation signal.

7. The method of claim 1, wherein the one or more time-slots are identified in a control channel of the forwarded reservation signal.

8. The method of claim 1, wherein the first reservation signal is received in a first portion of a 5G New Radio (NR) slot and the forwarded reservation signal is transmitted in a second portion of the 5G NR slot.

9. The method of claim 8, wherein control information associated with the first reservation signal is received in the first portion of the 5G NR slot and control information associated with the forwarded reservation signal is transmitted in the second portion of the 5G NR slot.

10. A first wireless communication device that is a node of a vehicle ad-hoc network (VANET), the first wireless communication device comprising:
    a receiver configured to:
       receive, from a second wireless communication device that is another node of the VANET, a first reservation signal that identifies one or more time-slots that have been reserved by the second wireless communication device for data transmissions within the VANET, and
       receive, from a third wireless communication device that is another node of the VANET, a second reservation signal that identifies at least one time-slot that is the same as a time-slot that was identified in the first reservation signal;
    a controller configured to determine that data to be transmitted by the second wireless communication device has a higher priority than data to be transmitted by the third wireless communication device; and
    a transmitter configured to transmit a forwarded reservation signal that identifies the one or more time-slots that have been reserved by the second wireless communication device for data transmissions within the VANET, the forwarded reservation signal based, at least partially, on the first reservation signal and containing information upon which one or more additional wireless communication devices may determine whether to transmit data within the one or more time-slots identified in the forwarded reservation signal.

11. The first wireless communication device of claim 10, wherein the transmitter is further configured to transmit the forwarded reservation signal if a received power value of the first reservation signal is within a pre-defined received power range.

12. The first wireless communication device of claim 10, wherein the transmitter is further configured to transmit the forwarded reservation signal if first wireless communication device is within a geographical distance from the second wireless communication device.

13. The first wireless communication device of claim 10, wherein a physical format of the first reservation signal is hard coded.

14. The first wireless communication device of claim 10, wherein a physical format of the first reservation signal is configured via higher layer signaling.

15. The first wireless communication device of claim 10, wherein the one or more time-slots are identified in a control channel of the first reservation signal.

16. The first wireless communication device of claim 10, wherein the one or more time-slots are identified in a control channel of the forwarded reservation signal.

17. The first wireless communication device of claim 10, wherein the receiver is further configured to receive the first reservation signal in a first portion of a 5G New Radio (NR) slot, and the transmitter is further configured to transmit the forwarded reservation signal in a second portion of the 5G NR slot.

18. The first wireless communication device of claim 17, wherein control information associated with the first reservation signal is received in the first portion of the 5G NR slot and control information associated with the forwarded reservation signal is transmitted in the second portion of the 5G NR slot.

* * * * *